(12) United States Patent
Blackwell et al.

(10) Patent No.: US 9,751,111 B2
(45) Date of Patent: Sep. 5, 2017

(54) FACILITY WIDE MIXED MAIL SORTING AND/OR SEQUENCING SYSTEM AND COMPONENTS AND METHODS THEREOF

(71) Applicant: LOCKHEED MARTIN CORPORATION, Bethesda, MD (US)

(72) Inventors: Wayne Blackwell, Chenango Forks, NY (US); David Brown, Silver Spring, MD (US); Bryan Dalton, Endicott, NY (US); Thomas Erb, Endicott, NY (US); Mark Gaug, Vestal, NY (US); John Nasakaitis, Elmira, NY (US); Michael Riess, Endicott, NY (US); Jonathan Wee, Endicott, NY (US); Bruce Williams, Endwell, NY (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 116 days.

(21) Appl. No.: 14/643,705

(22) Filed: Mar. 10, 2015

(65) Prior Publication Data

US 2015/0231670 A1 Aug. 20, 2015

Related U.S. Application Data

(63) Continuation of application No. 13/909,782, filed on Jun. 4, 2013, now Pat. No. 9,020,634, which is a
(Continued)

(51) Int. Cl.
*B07C 3/00* (2006.01)
*B07C 3/02* (2006.01)
(Continued)

(52) U.S. Cl.
CPC .................. *B07C 3/02* (2013.01); *B07C 1/20* (2013.01); *B07C 5/00* (2013.01); *B65G 1/06* (2013.01); *G06Q 50/28* (2013.01)

(58) Field of Classification Search
CPC ................ B07C 1/20; B07C 3/00; B07C 5/00
(Continued)

(56) References Cited

U.S. PATENT DOCUMENTS 4,388,994 A 6/1983 Suda et al.
4,615,446 A 10/1986 Pavie
(Continued)

FOREIGN PATENT DOCUMENTS

WO WO-03011484 2/2003
WO WO-2006110484 10/2006

OTHER PUBLICATIONS

European Office Action for Application No. 08830359.9 dated Aug. 19, 2014; 3 Pages.
(Continued)

*Primary Examiner* — Leslie A Nicholson, III
(74) *Attorney, Agent, or Firm* — Kent Kemeny; Andrew M. Calderon; Roberts Mlotkowski Safran Cole & Calderon, P.C.

(57) ABSTRACT

The invention generally relates to a facility wide sorting and/or sequencing system for improving product processing operations and, more particularly, to a facility wide system and related functionality for simultaneously sorting and sequencing mixed mail pieces such as, for example, flats and letter mail pieces. The flats and letter mail pieces are placed in frames so that all types of mail pieces can be sorted and/or sequenced simultaneously through merging and diverting a stream of filled trays into and out of different streams at a full or substantially full transport speed.

20 Claims, 9 Drawing Sheets

Related U.S. Application Data continuation of application No. 12/677,720, filed as application No. PCT/US2008/010715 on Sep. 12, 2008, now Pat. No. 8,457,781.

(60) Provisional application No. 60/960,050, filed on Sep. 13, 2007, provisional application No. 61/071,860, filed on May 22, 2008.

(51) Int. Cl.
*G06Q 50/28* (2012.01)
*B65G 1/06* (2006.01)
*B07C 5/00* (2006.01)
*B07C 1/20* (2006.01)

(58) Field of Classification Search
USPC ........... 414/281, 807; 198/348, 370.01, 367; 209/584, 900; 271/2; 700/224
See application file for complete search history.

(56) References Cited

U.S. PATENT DOCUMENTS

| | | | |
|---|---|---|---|
| 4,711,357 A | 12/1987 | Langenbeck et al. | |
| 5,551,543 A | 9/1996 | Mattingly et al. | |
| 5,833,076 A | 11/1998 | Harres et al. | |
| 5,857,830 A | 1/1999 | Harres et al. | |
| 5,947,468 A | 9/1999 | McKee et al. | |
| 5,993,132 A | 11/1999 | Harres et al. | |
| 6,026,967 A | 2/2000 | Isaacs et al. | |
| 6,135,697 A | 10/2000 | Isaacs et al. | |
| 6,183,191 B1 | 2/2001 | Mandie et al. | |
| 6,390,756 B1 | 5/2002 | Isaacs et al. | |
| 6,607,065 B2 | 8/2003 | Peppel | |
| 7,124,876 B2 | 10/2006 | Wolf | |
| 7,777,148 B2 | 8/2010 | Zimmermann | |
| 7,928,336 B2 | 4/2011 | Stemmle | |
| 7,971,701 B2 | 7/2011 | Fourney | |
| 8,143,548 B2 * | 3/2012 | Stemmle | B07C 3/08 209/584 |
| 8,552,327 B2 * | 10/2013 | Pippin | B07C 3/00 209/583 |
| 8,731,707 B2 | 5/2014 | Stemmle | |
| 8,766,128 B2 | 7/2014 | Stemmle | |
| 8,796,577 B2 * | 8/2014 | Harres | B07C 3/00 209/583 |
| 9,415,422 B2 * | 8/2016 | Worth, II | B07C 3/08 |
| 2003/0038065 A1 | 2/2003 | Plppln et al. | |
| 2003/0168388 A1 | 9/2003 | Malatesta | |
| 2005/0230222 A1 | 10/2005 | Olson et al. | |
| 2005/0247606 A1 | 11/2005 | Redford et al. | |
| 2007/0056886 A1 | 3/2007 | Yui | |
| 2009/0000996 A1 | 1/2009 | Stemmle | |
| 2010/0049360 A1 | 2/2010 | Stemmle | |
| 2010/0070070 A1 | 3/2010 | Stemmle | |

OTHER PUBLICATIONS

Extended European Search Report for Application No. 08830359.9 dated Jun. 21, 2012.
Office Action in related U.S. Appl. No. 14/642,826 dated Jan. 5, 2017, 7 pages.
Final Office Action in related U.S. Appl. No. 14/642,826 dated Apr. 19, 2017, 15 pages.
EP Office action dated May 3, 2017 in related Application No. 08830359.9-1706, 3 pages.

* cited by examiner

FACILITY WIDE MIXED MAIL SORTING AND/OR SEQUENCING SYSTEM AND COMPONENTS AND METHODS THEREOF

CROSS REFERENCE TO RELATED APPLICATIONS

The present application claims priority to U.S. Provisional Application No. 60/960,050 filed on Sep. 13, 2007, U.S. Provisional Application No. 61/071,860 filed on May 22, 2008, PCT application no. PCT/US08/010715 filed on Sep. 12, 2008, U.S. application Ser. No. 12/677,720 (now U.S. Pat. No. 8,457,781) filed on Sep. 24, 2010, and U.S. application Ser. No. 13/909,782 filed on Jun. 4, 2013, the disclosures of which are incorporated by reference in their entireties herein.

DESCRIPTION

Field of the Invention

The invention generally relates to a facility wide sorting and sequencing system for improving product processing operations and, more particularly, to a facility wide system and related functionality for simultaneously sorting and sequencing mixed mail pieces such as, for example, flats and letter mail pieces.

Background Description

The sorting of mail is a very complex, time consuming task. In general, the sorting of mail is processed through many stages, including front end and back end processes, which sort and sequence the mail in delivery order sequence. These processes can either be manual or automated, depending on the mail sorting facility or the type of mail to be sorted such as packages, flats, letter and the like. A host of other factors may also contribute to the automation of the mail sorting, from budgetary concerns to modernization initiatives to access to appropriate technologies to a host of other factors.

SUMMARY OF THE INVENTION

By way of non-limiting examples, the following is a list of acronyms that may be used in the instant application. This list should not be considered exhaustive of all acronyms used herein, and is provided merely for reference and convenience. These acronyms may also be defined within the instant application.

| Acronym | Description |
| --- | --- |
| AFCS | Advanced Facer Canceller System |
| AFSM 100 | Automated Flat Sorting Machine 100 |
| APPS | Automated Package Processing System |
| AMC | Airport Mail Center |
| AO | Associate Office |
| API | Application Programming Interface |
| ATHS | Automatic Tray Handling System |
| BCR | Bar Code Reader |
| BMC | Bulk Mail Center |
| BODS | Barracuda Operational Data Store |
| CIOSS | Combined Input/Output Subsystem |
| CPU | Central Processing Unit |
| DBA | Database Administrator |
| DBCS | Delivery Bar Code Sorter |
| DBCS-OSS | Delivery Bar Code Sorter/Output Subsystem |
| DIOSS | Delivery Bar Code Sorter Input/Output Subsystem |
| DPS | Delivery Point Sequencing |
| DU | Delivery Unit |
| EFFS | External File Format Specification |
| EOR | End of Run |
| FCM | First Class Mail |
| FICS | Flats Identification Code Sort |
| FIFO | First In First Out |
| FIM | Facing Identification Mark is a bar code designed by the United States Postal Service to assist in the automated processing of mail. In embodiments, FIM can be a set of vertical bars printed on the mail pieces. FIM is intended for use primarily on preprinted mail pieces printed by a sender. |
| FRU | Field Replaceable Unit |
| FSM | Flat Sorting Machine |
| FSS | Flat Sequence System |
| GPS | Global Positioning System |
| GUI | Graphical User Interface |
| HMI | Human Machine Interface |
| HTTP | Hypertext Transfer Protocol |
| ICD | Interface Control Document |
| ID | Identification |
| IDS | Integrated Data System |
| JDBC | Java Database Connectivity |
| LAN | Local Area Network |
| MPE | Mail Processing Equipment |
| MTE | Mail Transport Equipment |
| NDSS | National Directory Support System |
| OCR | Optical Character Reader |
| ODBC | Open Database Connectivity |
| PICS | Postal Identification Code Sort |
| PMPC | Priority Mail Processing Center |
| P&DC | Processing and Distribution Center |
| P&DF | Processing and Distribution Facility |
| RBCS | Remote Bar Coding System |
| RCR | Remote Computer Reader |
| RDBMS | Relational Database Management System |
| REC | Remote Encoding Center |
| RMA | Reliability, Maintainability, Availability |
| SAD | System Architecture Document |
| SOP | System Operating Procedure |
| SQL | Sequential Query Language |
| SSS | System/Subsystem Specification |
| TCP/IP | Transmission Control Protocol/Internet Protocol |
| TPM | Technical Performance Measurement |
| UFSM | Upgraded Flat Sorting Machine |
| URS | Universal Recognition System |
| USPS | United States Postal Service |
| ZIP | Zone Improvement Program |

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

Figure 1:
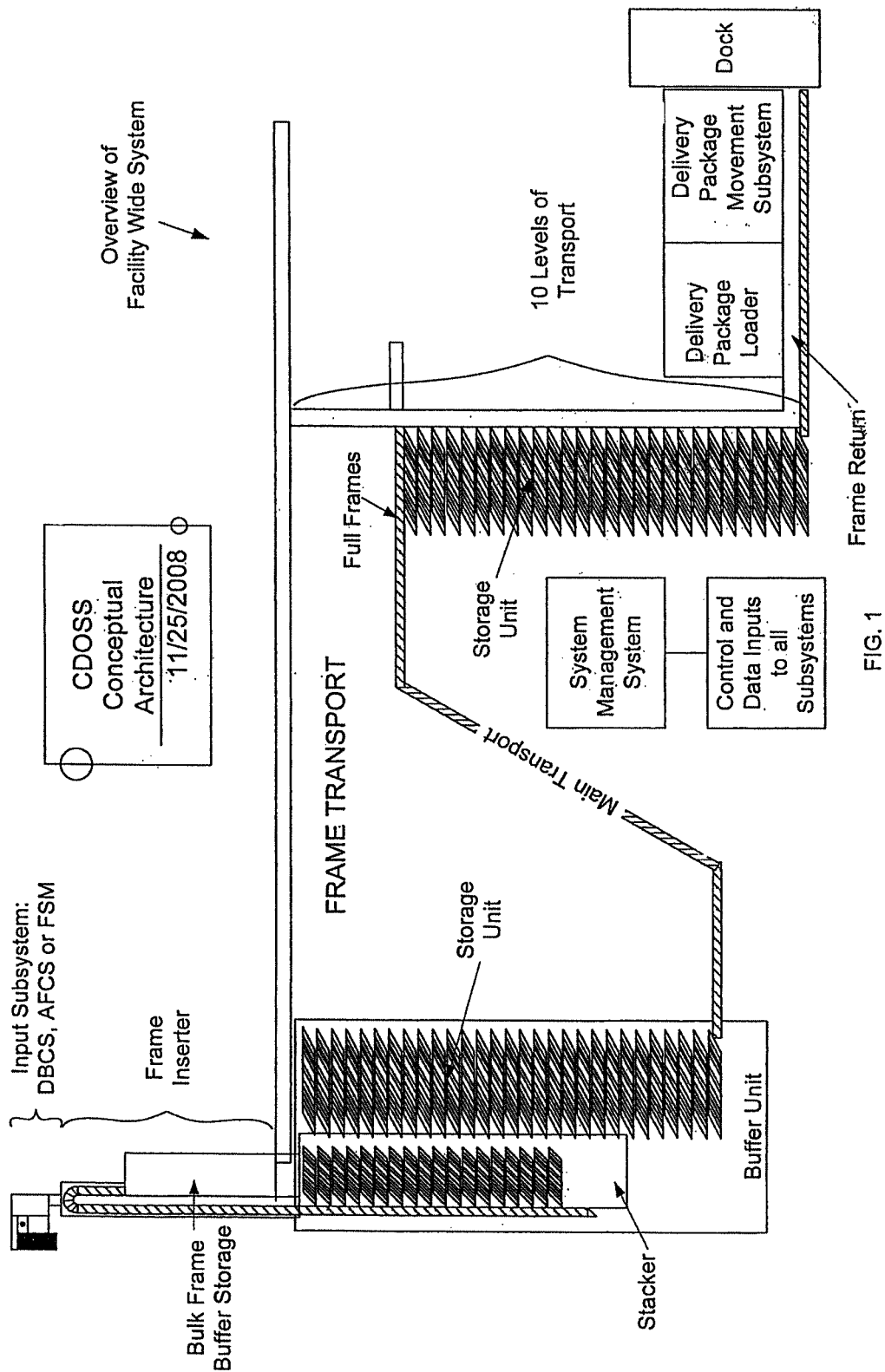
FIG. 1 shows an exemplary overview of a system architecture in accordance with aspects of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of System

The invention generally relates to improving product processing operations and, more particularly, to a method and system of sorting and/or sequencing letter mail, flats and parcels and other objects. The system and method can be implemented in a warehouse, or mail sorting or any type of sorting facility. Implementing the present invention allows for the continuous sorting of mail pieces to any level of sortation using a single pass. To accomplish the advantages of the invention, the system and method uses multiple stages of diverts and merges, e.g., individual mail pieces are diverted into a sortation system composed of multiple stages each with many parallel paths. The mail pieces are merged and combined into sequenced order at the conclusion of sorting. Moreover, in accordance with aspects of the invention, the mail pieces are sorted and/or sequenced in a stacked configuration, e.g., face-to-face (i.e., not end-to-end), in frames thus resulting in high throughput at low conveyor speeds. The present invention also relates to controls and methods for processing mail pieces throughout a facility and provides a seamless integration of computing functionality, e.g., sorting and sequencing methodologies, controls, etc., as further discussed below. The present invention represents a quantum leap over current mail sortation and sequencing operations.

More specifically, with the present invention, a facility-wide sorting and/or sequencing system incorporates the sorting and/or sequencing of flat mail, letter mail and, in embodiments, small parcels in a one pass stream. In embodiments, flat mail, letter mail and, in embodiments, small parcels, are placed into frames which are transported in a face-to-face orientation, which significantly increases throughput while potentially decreasing the footprint of the facility wide machine. The facility wide system includes input feeders, where mail pieces are singulated, the mail piece address and/or bar codes are recognized, and the mail pieces are transported individually into the induction and sequencing portions of the system. The input feeders, in embodiments, can be conventional flat and letter feeders which are integrated into the system of the present invention. The system further includes a mail frame induction system, where the mail pieces are matched with a frame, inducted into the frames, and transported and merged into a sequence or certain sort depth using a diverting and merging methodology as discussed in further detail below. Throughout the system, the frames can be managed by controls, e.g., compressed and or expanded, merged, diverted, sorted and/or sequenced, and shuttled throughout subcomponents in an efficient and cost effective manner. Once the combined mail pieces are in a sequence or a certain sort depth, the mail pieces are extracted from the frames using a mail piece extraction subsystem. Advantageously, the frames and mail pieces can be transported through various stages, e.g., between many different subsystems, using transports such as, for example, shuttles. The shuttles allow the frames and mail pieces to move quickly and efficiently throughout the facility.

Also, the system of the present invention is modular, which allows it to be expanded depending on the needs of a particular facility. The modularity of the system of the present invention also allows the system to be used with current machinery such that sorting and sequencing processes can continue without any significant interruption during the assembly of the facility wide system. Additionally, as discussed in more detail below, the system and method of the present invention includes unique sorting and/or sequencing schemes, transport systems, e.g., lead screws, right angle diverts, etc., as well as computing functions, storage facilities, and preventive detection of maintenance issues. In addition, the present invention contemplates the use of certain architectures, facility and postal wide schemes, methodologies and systems that result in great savings to the postal system and increased efficiency of sorting and/or sequencing and floor space.

More particularly, the present invention includes, in addition to other systems, components, etc, a facility wide mail sortation and/or sequencing system having the following functionality, components, etc. as shown in FIG. 1. It should be noted that FIG. 1 is representative of a general overview of the system and, as such, additional features, capabilities, functions, etc. are contemplated by the present invention as described throughout the instant application.

Input Devices

The input devices are a series (1 to many) of mail piece feeders such as, for example, letter feeders, flat feeders and parcel feeders. These input devices comprise a barcode or address scanner, an algorithm that calculates the output bin associated with the input mail piece, a mechanical interface to convey mail from the output into the facility wide system, and a computing interface to communicate the associated address information to the remaining portions of the system. The bar code sorter may also communicate other information associated with a mail piece including mail image(s), indicia image(s) or characteristics, dimensions, barcodes, weights, sorter identification, and sortation information. More specifically, information that may be received, tracked and communicated throughout the system includes, for example, the following mail piece information from each induction subsystem:

Length;
Width;
Height;
Volume;
Orientation;
Overall Length;
Overall Width;
Transverse Position;
Barcode Information on the mail piece;
Address information returned form the AARS;
Weight;
Location; and
Mail type.

Facility Wide Sorting and/or Sequencing System

The Facility Wide Sorting System includes many subsystems such as, for example, mail frame inductors to induct many different types of mail pieces, e.g., letters, flats, small parcels, into frames for transportation throughout the system; right angle diverts and merging points to sort and sequence mail pieces in the frames, shuttles for transporting the frames between subsystems and components, mail frame extractors and controls such as, for example, management systems for controlling the functions of the system, e.g., sorting and sequencing processes. The system further includes inter and intra facility components and networks and related functions and visibilities, as discussed herein. Some systems include, as an example, an identification subsystem that takes input data from the input devices and associates one or more electronic identifier uniquely to each mail piece. These electronic identifiers are used to track mail piece and to associate all related data to the mail piece.

Storage Subsystem

The storage subsystem is capable of storing mail between the receipt of mail to the dispatch of it. The storage system may be modular in nature, to be able to be sized to handle the volume of mail pieces from many different sizes of facilities. The association of a unique identification of the mail determines storage operations with its position in the system.

Input Subsystem

The Input Subsystem includes the Delivery Bar Code Sorters (DBCS) and the Flat Sorter Machines (FSM). In some embodiments, to take advantage of current USPS investments, the system of the invention uses the input sections (including induction stations, singulation, Optical Character recognition, barcode assignment, and facing canceling) of existing sortation systems. The portions of these systems used are the singulation, address/barcode assigning/reading/interpretation of the units.

Frame Inserter

The Frame Inserter places individual mail pieces into frames. It is assumed that mail piece frames will come in many different sizes. The inserter or its computing subsystem will choose the proper size of mail frame and insert the mail inside by using, e.g., optical recognition technology, photodiodes, or other known technologies all of which are capable of being implemented by one of skill in the art. In embodiments, the inserter shall be capable of inserting flat and letter mail at the rate of about 35,000 mail pieces per hour. In embodiments, the inserter can be a rotary inserter. By way of example, the rotary inserters include two pinch belts. As the mail passes between the pinch belts, it will be inserted within the frames as they are automatically expanded about a radius of the frame. (The frames open as they revolve around a carousel.) The rotary inserter, in embodiments, has the capability of about 35,000 insertions per hour. In implementation, it is contemplated that there would be one inserter for every DBCS or every two FSM machines.

Frames

The frames are designed to hold mail pieces. Although many different sizes of frames are contemplated by the present invention, two specific sizes of frames can include one full-height (which can contain any size mail piece) and one half-height that shall convey mail pieces smaller than 6 inches tall. Frames are capable of being measured for minimal thickness necessary for diversion. A frame maximum thickness when stacked empty can be less than 0.1 inch. Also, frames containing mail pieces of less than or equal to 0.1 thickness can store the resulting mail pieces on ⅛ inch centers. The frames are also configured and structured to be closed (sealed to prevent mail piece from escaping during sortation and transportation) at the end of insertion operations. In still further embodiments, the frames should be able to be stored in variably spaced storage units (only occupy the thickness of the mail piece). Also, the frames are designed such that they are able to be stored, diverted, retrieved and conveyed during normal truck transportation vibration at full conveyor speed. Also, the frames are conveyed and diverted with only the drive power from the conveyor, e.g., transportation system.

Buffer Subsystem

In certain embodiments, the Buffer Subsystem assures that surges in mail input do not result in overstressing the transport and assures that mail pieces get routed to the proper transport layer.

Transport Subsystem

The Transport Subsystem includes the numerous conveyors that transport the mail frames internally through the system. The transports carry the frames from the inserters throughout the system. In embodiments, the transport can handle about 80,000 mail pieces per hour (or 800,000 per hour for the main trunk). Transports include straight, curved, and ramped conveyors preferably of a lead screw type. The transport, in one embodiment, may be stacked layers.

Storage Subsystem

The Storage Subsystem automatically stores and retrieves mail pieces (in frames). This system can include buffers or storage areas for shuttles, which are designed to hold the frames during transport between different components.

Delivery Container Loader

The Delivery Container Loader packs the mail pieces into Delivery Containers. In embodiments, the loader resembles a conveyor other than the walls are a series of delivery containers. The containers are loaded at the speed of the conveyor. There is a small buffer to allow switching between full and empty containers. In embodiments, the following is noted.

The delivery container loader is configured to not require additional packaging machinery (like lidders/banders) to make the packages ready for delivery.

The delivery container loader is configured to automatically load an empty container when a previous container is full.

The delivery container loader is configured to at least operate 10 minutes without requiring manual intervention including adding new packages, or removing full packages.

System Management Subsystem

The System Management Subsystem controls and coordinates all system operations and maintains the identity of all mail pieces and/or frames. The system management subsystem is the series of computers that control and schedule all system movements, keep track of all mail piece identification by position, interface with human operators, and that interface all information between subsystems. The system management subsystem can include known algorithms to sort/sequence the mail (in the frames), as well as controls to control the ejection of the mail from the frames, the stacking thereof, etc.

Delivery Container Movement Subsystem

The Delivery Container Movement Subsystem moves the Delivery Containers from the loader to the point of delivery (dock). This system can include specially designed carts that may be nestable as discussed in the instant application.

The system of the present invention should have as small a space footprint as possible. The footprint includes all major components and working areas for personnel associated with the equipment. As such, the components are designed to be located within existing USPS processing and delivery facilities. In addition, it is contemplated that the throughput of the sorting and/or sequencing is significantly increased compared to conventional systems, e.g., upwards of 80,000 frames or more per hour. Additionally, and advantageously, the system is designed to handle all types of mail, simultaneously, while still using some existing sortation equipment such as, for example, letter, flat and parcel input feeders.

Additional Systems and Components

Although not specifically shown, the system can also include additional components and systems such as, for example, an unpackaging subsystem, Dispatch Packaging system, Receipt Packaging system, and Input Multiplexing subsystem. More specifically, the Unpackaging subsystem removes mail pieces from the standard mail packages and puts the resultant mail into tubs or containers, directly into transportation vehicles, or delivery point packaging. The Dispatch Packaging system packages standard mail packages into containers for shipping to the processing facilities without removing the individual mail piece container. The Dispatch Packaging system also packages standard mail packages into shipping containers, rolling stock or directly into transportation vehicles to other processing facilities without removing the individual mail piece container. The Receipt Packaging system unpacks standard mail packages from shipping containers, rolling stock, or directly for transportation vehicles from other processing facilities without removing the individual mail piece container. The Input Multiplexing subsystem takes mail from many different input devices and delivers them to the many modular storage and sortation subsystems, described herein. This subsystem associates a mail unique identification with its position in the system. Multiplexing operations are determined by this association.

System Environment

Figure 1A:
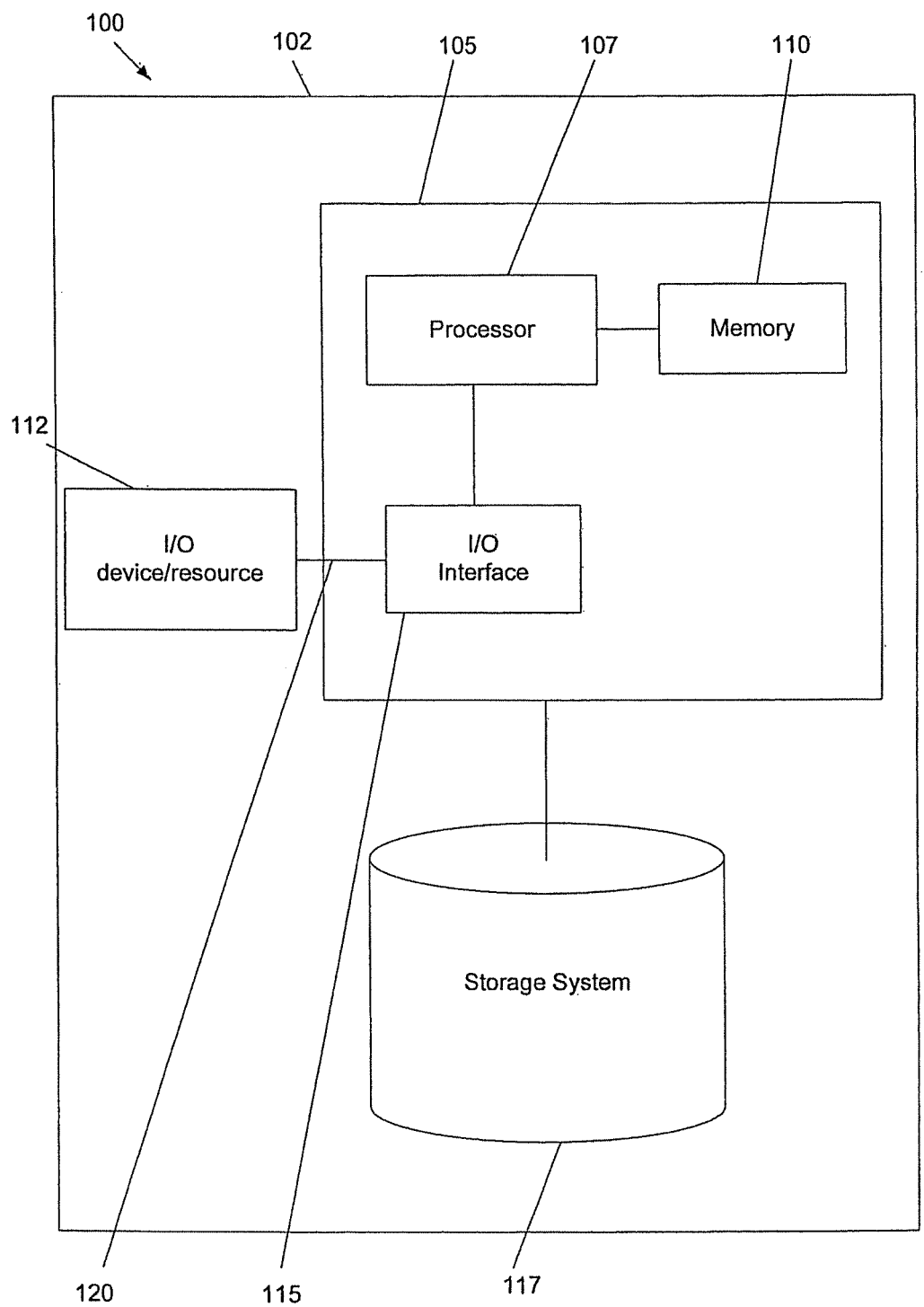
FIG. 1A shows an exemplary computer system environment for implementing a facility-wide mail sorting and/or sequencing system in accordance with aspects of the invention.

FIG. 1A shows an exemplary computer system environment 100 for implementing a facility wide mail sorting and/or sequencing system in accordance with the invention. As shown in FIG. 1A, the exemplary computer system environment 100 includes a computer infrastructure 102 that is operable to perform the processes described herein using a computing device 105. The computer infrastructure 102 can be, for example, one or more servers that are accessible by different computing devices throughout the facility or remotely from the facility.

The computing device 105 includes a processor 107, a memory 110, an input/output (I/O) interface 115, and a bus 120. The bus 120 provides a communications link between each of the components in the computing device 105. The communications link may be a wire or wireless link such as, for example, a LAN, WAN, intranet or the Internet. Additionally, the computer system environment 100 includes a storage system 117, e.g., database. While only a single storage system 117 is shown, it should be understood that the computer infrastructure 102 may include any number of storage systems 117. Moreover, it should be understood that, in embodiments, the storage system 117 may include one or more local storage systems implemented throughout the facility wide system and/or one or more remote storage systems. For example, the one or more storage systems 117 can be utilized to store information such as, for example, sorting and/or sequencing schemes, allocation plan, mail piece position within the facility, dock management information, control of different subcomponents, frame and mail piece size, identification and other attribute information, frame manifest, system wide functions, maintenance information, etc, as discussed in further detail below.

The processor 107 executes computer program code processes on computer storage media, which may be stored in the memory 110 and/or storage system 117. The computer storage media may be, for example, a magnetic or optical portable disk, a hard drive, random access memory (RAM), read-only memory (ROM), an erasable programmable read-only memory, etc. to name a few. While executing computer program code, the processor 107 can read and/or write data to/from the memory 110, storage system 117, and/or I/O interface 115. The memory 110 may include, for example, local memory employed during actual execution of program code, bulk storage, and/or cache memories which provide temporary storage of at least some program code to reduce the number of times code must be retrieved from bulk storage during execution.

Further, the computing device 105 is in communication with an external I/O device/resource 112. The I/O device 112 can interact with the computing device 105. In embodiments, the external I/O device/resource 112 may be, for example, a keyboard, one or more interfaces, one or more pointing devices, etc.

Thus, for example, as described herein further below, the computer infrastructure 102 may include one or more computing devices, e.g., for each processing and delivery center (P&DC) or for each regional command center. Moreover, in embodiments, the computer infrastructure 102 may be provided for each regional command center, wherein the computer infrastructure 102 of each regional command center is in communication with the other computer infrastructures 102 of the other regional command centers of the system-wide mail sorting and/or sequencing system.

Vertical and Horizontal Transportation of Batches of Mail

The present invention is directed to a system for vertical and horizontal transportation of batches of mail and storage thereof. More specifically, the invention relates to a mastless Automated Storage/Retrieval System (ASRS) that transports shuttles via, for example, platforms by use of a rack and pinion system. The system enables full random access of shuttles that contain frames of mail pieces while allowing for maintenance access without concern for crossing masts.

The present invention also provides buffers to buffer or prevent several minutes of surge inputs from effecting system operation. In implementation, the assignment of destination locations to layers, and deciding when to process mail that is presorted to one destination (or that has a large percentage to a certain destination), should prevent frequent input shutdowns.

In embodiments, the transports (platforms) are independent units with a cross belt conveyor that loads mail (e.g., shuttles) onto and off of itself. The platforms travel through a grid or matrix of tracks that allows each platform access to every buffering cell or bin. The system can be used to sort and/or sequence mail pieces and can be used, for example, to transport mail pieces in shuttles (as described in other sections of the instant invention). In further embodiments, the system of the present invention can also be used as a buffer for sorting and/or sequencing of mail pieces (such as flats and letters simultaneously).

In embodiments of the present invention, the platforms operate on a plurality of tracks that allow them to move along storage aisles or locations in the ASRS. In embodiments, the platforms attach to tracks that allow them to move vertically and/or horizontally. For example, the system is designed to allow a platform to stop at locations to receive and dispatch shuttles from either a front or rear of cells. Illustratively, in embodiments, the platform can deliver a shuttle to the front while another platform receives a shuttle from the rear.

The system is also designed to provide maintenance access of the tracks and mechanisms when an area is cleared of platforms and/or shuttles. Special transports could be used to troubleshoot platforms that are, for some reason, not able to move or have some other detected problems. The servicing transport could move in proximity, above or below, to the failed platform, attach to it, and retract the failed platform from the system, e.g., detach the pinion wheels via a spring loaded mechanism in a manner known to those of skill in the art. The platform and other components of the present invention are structured to handle shuttles that can weigh in excess of over one hundred pounds.

Figure 2A:
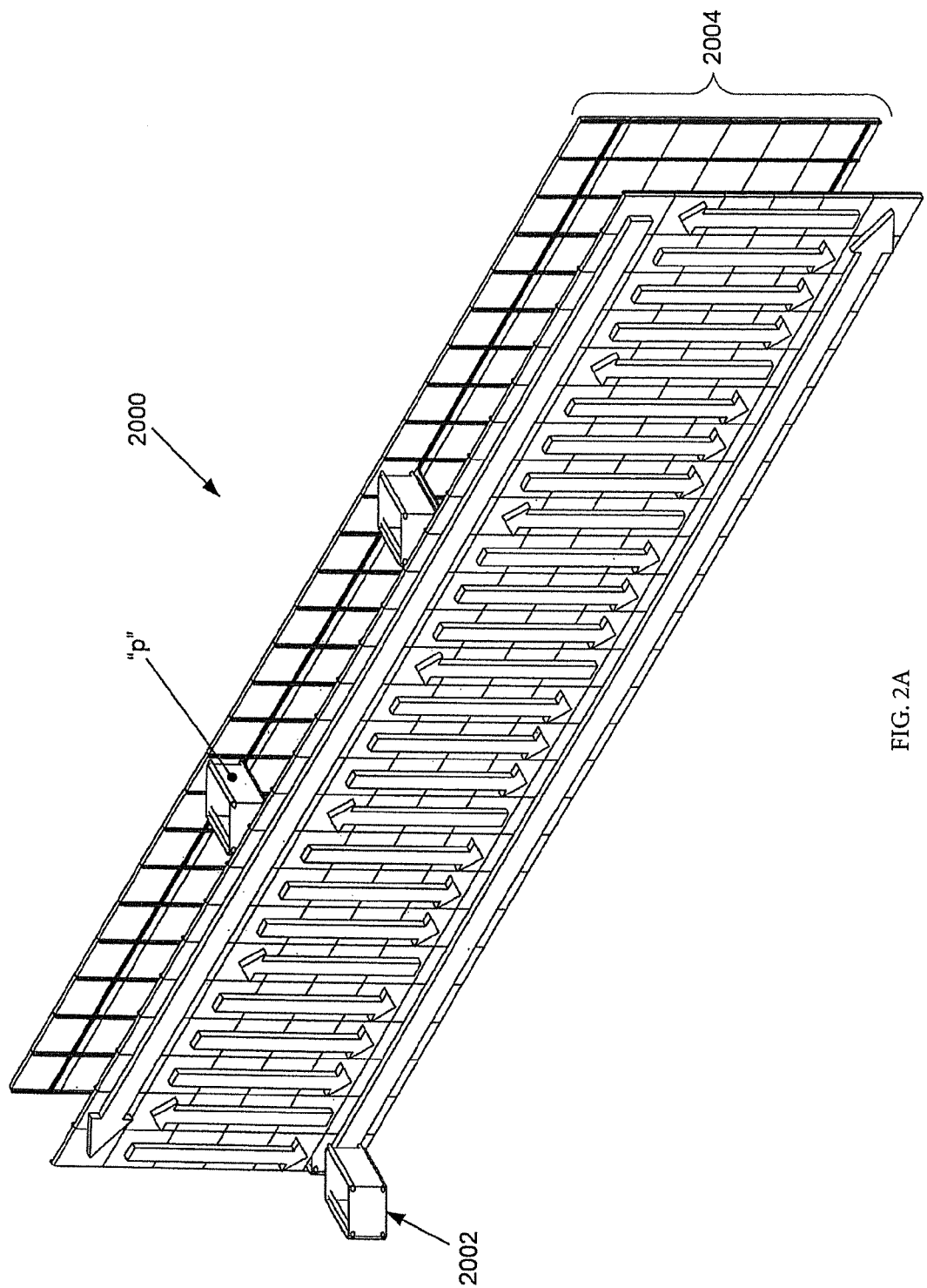
FIG. 2A show a transportation system in accordance with aspects of the invention.

FIG. 2A shows a transportation system in accordance with aspects of the invention, generally shown at reference numeral 2000. In embodiments, as shown in FIG. 2A, the transport system 2000 includes a receiving and/or discharge station 2002 which is designed to receive and discharge shuttles in accordance with the invention. For example, the receiving and/or discharge station 2002 can receive empty shuttles for temporary storage and discharge these empty shuttles to a presort accumulator where they are filled with frames. The receiving and/or discharge 2002 can then be used to receive the filled shuttles from the presort accumulator or other subsystems as described in the instant application for processing in the system of the present invention (e.g., in the system shown in FIGS. 2A and 2B). In embodiments, the shuttles include a plurality of mail pieces stored in frames such as, for example, letters and flats. The receiving and/or discharge station 2002 can be provided at other locations of the system and is shown at a lower portion of the transportation system 2000 for illustrative purposes only, which should not be considered a limiting feature of the present invention.

Still referring to FIG. 2A, the transportation system 2000 includes multiple levels 2004. In the embodiment shown in FIG. 2A, there are six levels 2004; although, more or less levels are contemplated by the present invention. As discussed in more detail with reference to FIGS. 2D-G, the transportation system includes a plurality of platforms "P" and related transportation mechanisms designed to transport the shuttles to each of the different levels and throughout the system (as shown in FIG. 2B, for example).

Figure 2B:
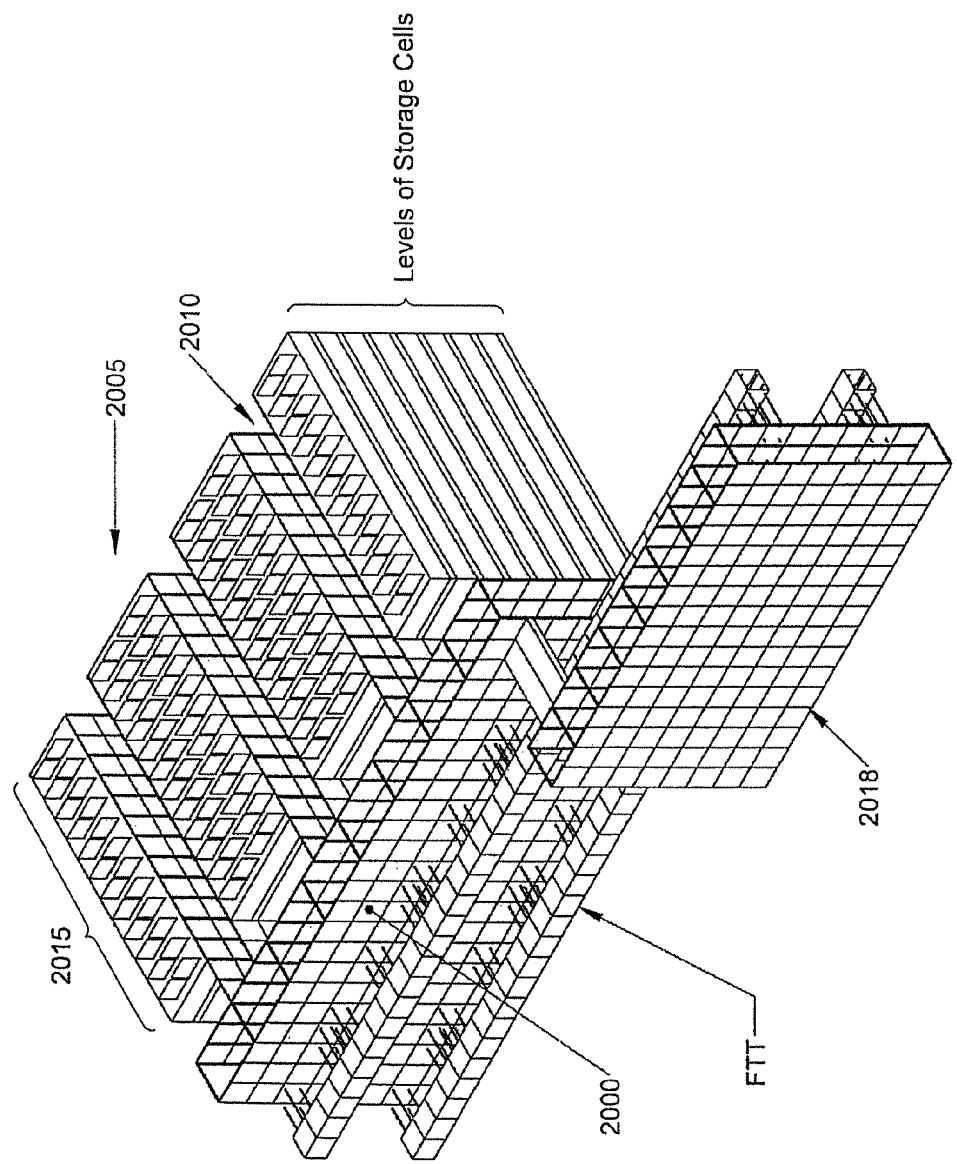
FIG. 2B show a buffering system in accordance with aspects of the invention.

FIG. 2B shows a related buffer system in accordance with aspects of the invention. Those of skill in the art should recognize that the two or more buffer systems as well as transportation systems shown in FIGS. 2A and 2B can work in conjunction with one another, e.g., be bridged to work as a single unit. In embodiments, the transportation system 2000 is connected to a plurality of storage aisles 2010 in the buffer system depicted generally as reference numeral 2005. In embodiments, the shuttles which were received in some order (e.g., random order) may be transported to any of the storage aisles 2010 for storage into individual storage cells 2015, from the transportation system 2000.

The storage cells 2015 can be on either or both side of the storage aisles 2010, and preferably adjacent to the platforms "P" such that the shuttles can be moved from the platforms to either side of the aisles 2010 to any of the storage cells 2015. The storage cells 2015 are structured and configured to store at least one shuttle. In embodiments, as shown in FIG. 2B, the buffer system includes six levels of storage cells 2015 with an equal number of rows as in the transportation system 2000. This allows the shuttles to be transported from the transportation system 2000 to any of the individual storage cells 2015 at any level of the buffer system 2005. In this way, the present system may be used to transport shuttles in a random access fashion.

In embodiments, the transportation system includes a buffer system 2005 for storing shuttles prior to the mail being sorted in accordance with aspects of the invention. In the present embodiment, the buffer system 2005 may include cells for one thousand shuttles; although, more or less cells for shuttles in the buffer system 2005 are contemplated by the present invention. The buffer system 2005 may be used for temporarily storing shuttles during the sorting and/or sequencing processes. The collection grid 2018 is used to refill the empty shuttles, in embodiments of the invention. In particular, frames filled with mail pieces may be transported in shuttles from storage aisles 2010 of the buffer system 2005 to the distribution grid 2000. The frames filled with mail pieces may then be removed from the shuttles and transported down the frame transport tube (FTT) for sorting or sequencing. Accordingly, while the frames filled with mail pieces are being sorted or sequenced, the empty shuttles are moved to the collection grid 2018. After the frames filled with mail pieces are sorted or sequenced, they are then loaded into the empty shuttles at the collection grid 2018. These shuttles, filled with sorted frames, may then be stored at the buffer system 2005 for a length of time. Additionally, the shuttles, filled with sorted frames at the buffer system 2005, may be transported to the storage aisles 2010 in a particular order, for storage and for subsequent removal from the storage aisles 2010 in a particular order.

In embodiments, the shuttles can be removed from the system shown in FIGS. 2A and 2B for sorting and sequencing processes. For example, the system can be used to transport shuttles (loads) to the storage aisles 2010 and storage cells 2015 in a random access fashion, with numerous platforms choreographed to pick up shuttles, deposit shuttles, as well as position shuttles for docking to processing stations or staging the mail pieces for in line processing. This can be accomplished by tracking and/or monitoring the position and/or location and contents of each of the shuttles as they enter the system, are stored throughout the system and are removed from the system. This can be performed under commands received from the computing infrastructure shown in FIG. 1A and more particularly from the FTA 2740, as the shuttles are transported throughout the transportation and buffer systems shown in FIGS. 2A and 2B. The contents of the shuttles can be recorded in a database, for example as shown in FIG. 1A, as they are placed on the shuttles, and the shuttles tracked as they enter and exit into and out of the system. Upon demand, the shuttles may be removed from the cells and brought to the storage area 2018, where the frames may be removed for sorting and/or sequencing at downstream processes. After the frames are sorted, they can be placed back into the shuttles and stored again in the system of FIG. 2B, for example. A dispatch manager and related controls, subsystems, and function as described in other sections of the instant application can be used, for example, to determine locations and positions of the shuttles, loading areas, etc., as well as monitor for jams, failures, or obstructions and if detected, dynamically select an alternative path.

Figure 2C:
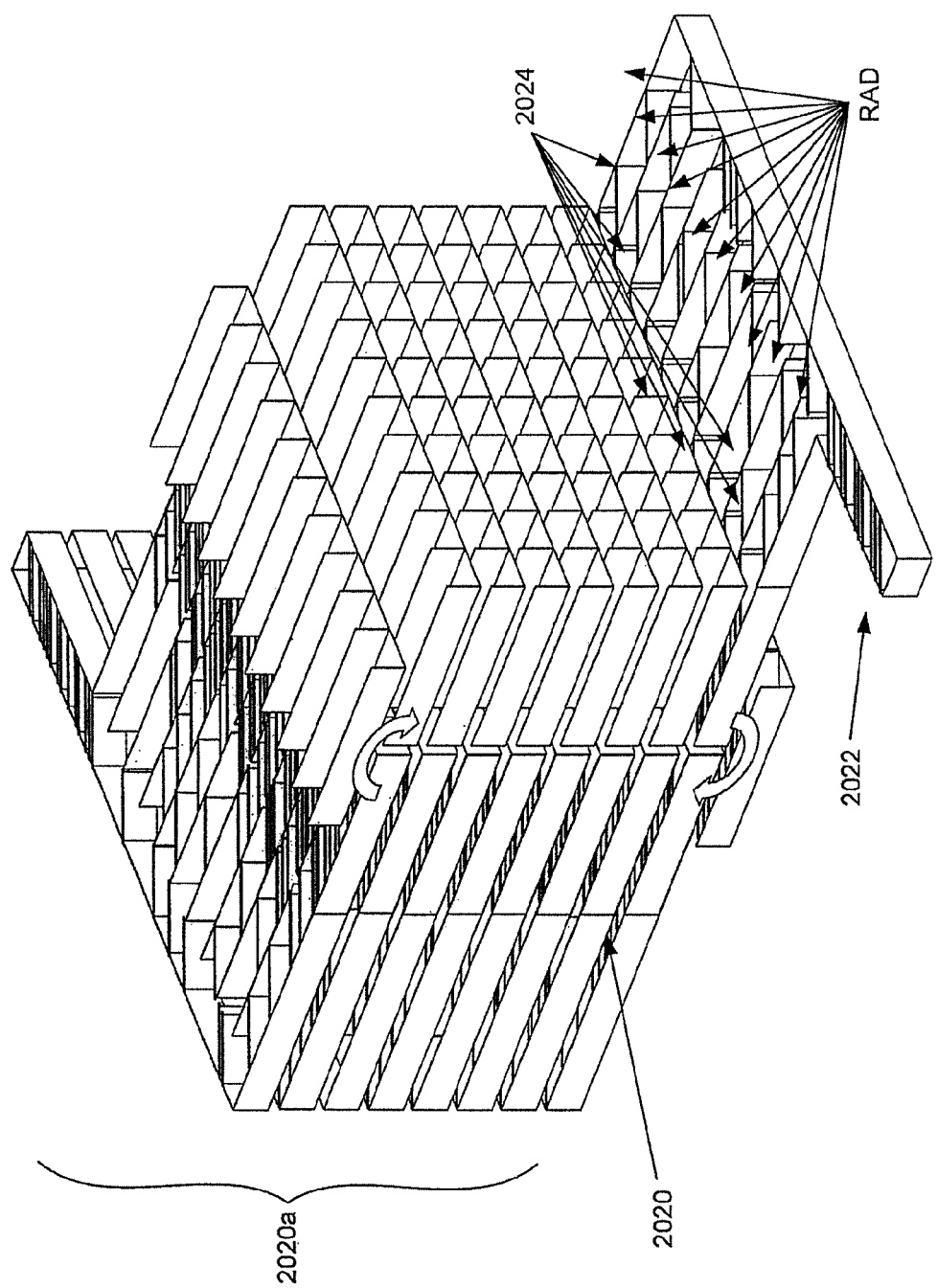
FIG. 2C shows an alternate transportation system in accordance with aspects of the invention.
Figure 2D:
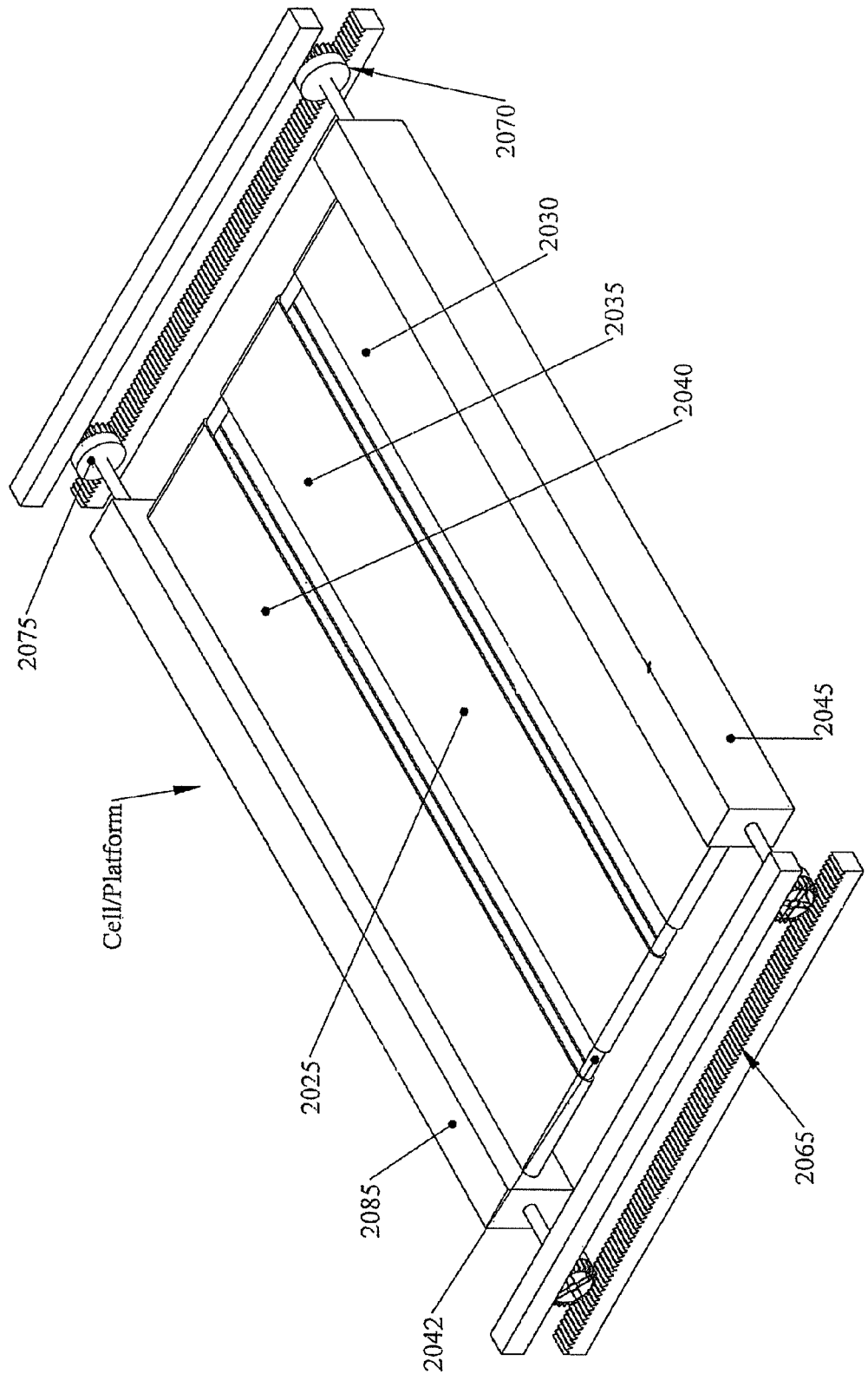
FIG. 2D shows details of a cell having a rack and pinion track system in accordance with aspects of the invention.
Figure 2E:
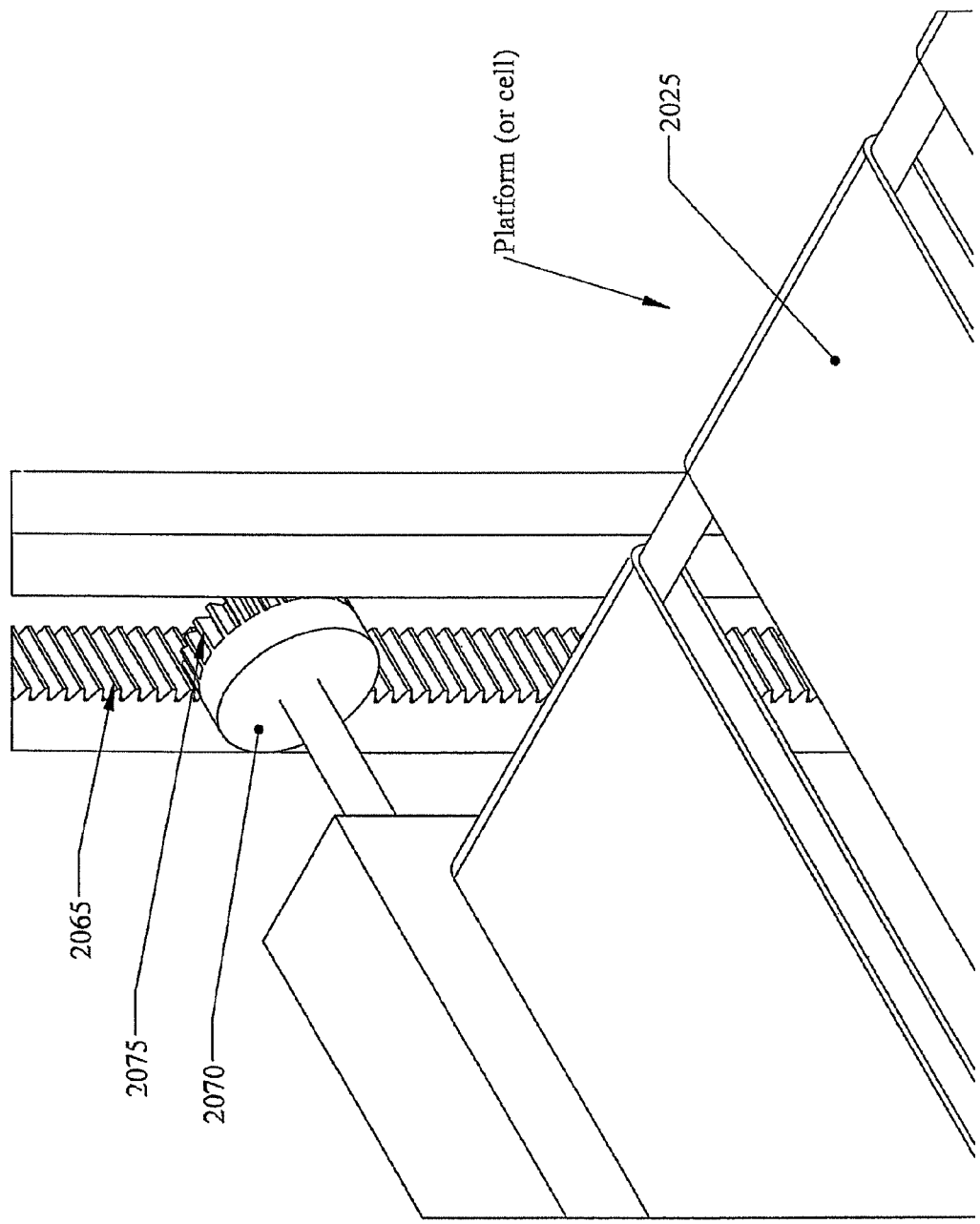
FIG. 2E is an enlarged view showing details of a platform and its gear mechanism that operate in accordance with aspects of the invention.
Figure 2F:
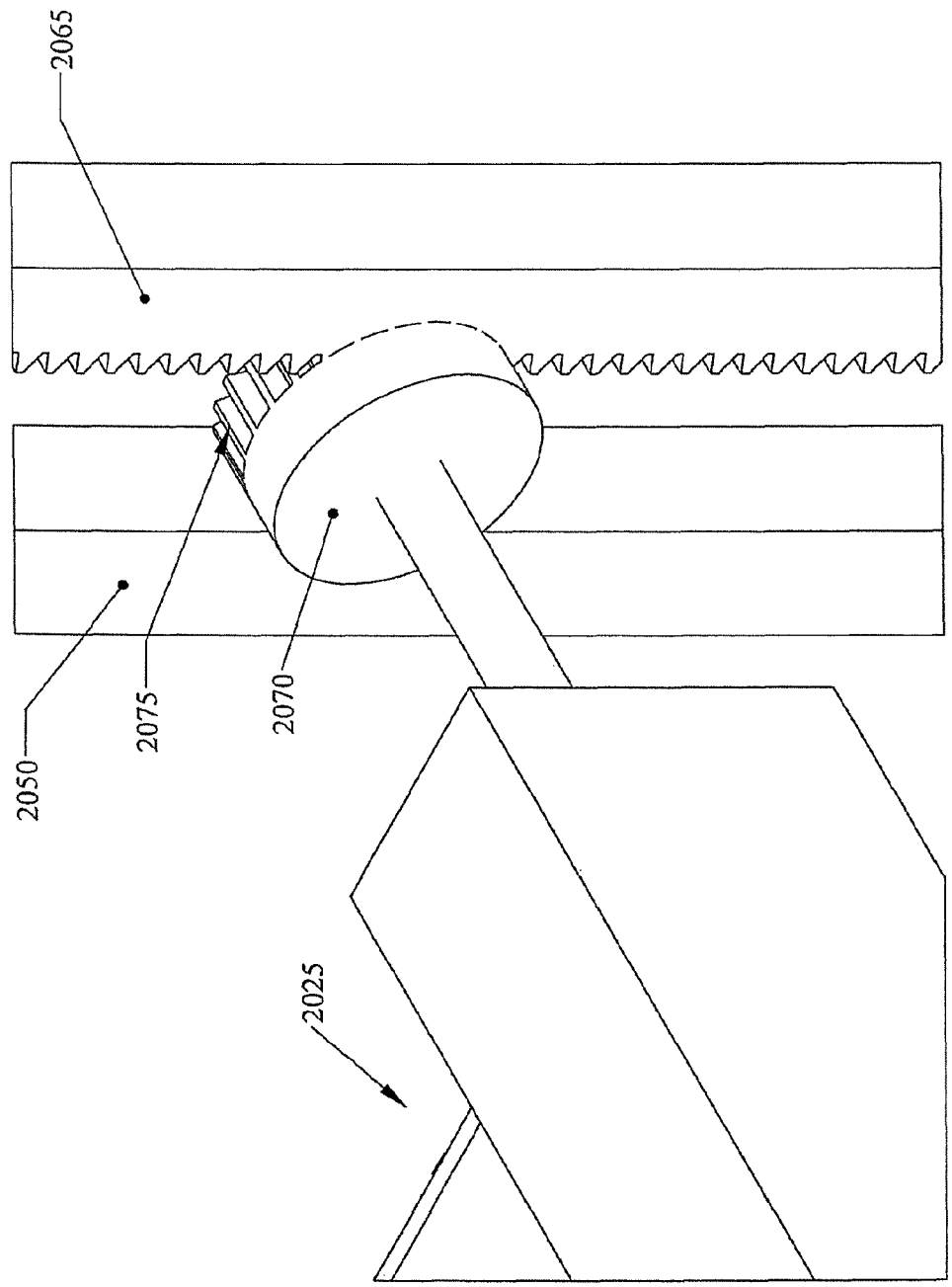
FIG. 2F is an enlarged view showing details of the platform and its gear mechanism that operate in accordance with aspects of the invention.
Figure 2G:
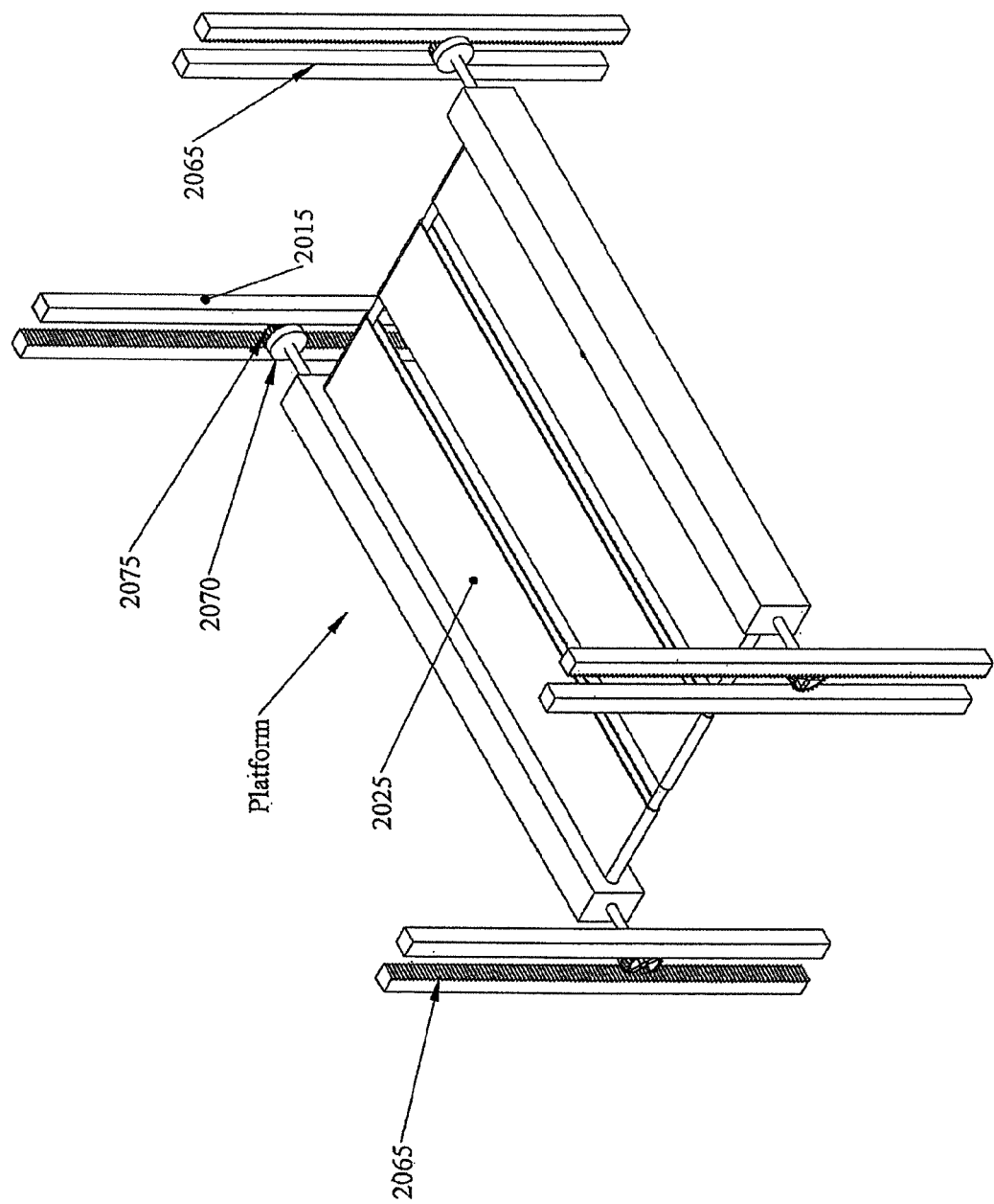
FIG. 2G shows details of the platform and its gear mechanism that operate in accordance with aspects of the invention.

FIG. 2C shows another embodiment in accordance with the invention. In this embodiment, the mail pieces can be provided within an elevating system shown generally as reference numeral 2020. The elevating system 2020 includes a plurality of levels 2020a, fed from a transportation path 2022. As should be understood by those of skill in the art, the transportation path 2022 is structured and configured to transport mail pieces that are stored in frames. This can be accomplished by use of lead screws (LS), cogged belts or other transportation system as discussed in the instant application. The transportation path 2022 also includes a plurality of right angle diverts (RAD) in order to move the frames to different transportation paths 2024. The transportation paths also can include compression and/or decompression zones as discussed in the instant application. The different levels also include transportation paths structured and configured to transport mail pieces that are stored in frames. Again, this can be accomplished by use of lead screws (LS), cogged belts or other transportation system, as well as right angle diverts (RAD). Although the vertical carousel shown in FIG. 2C is used for transporting mail pieces in frames, between a lower level and higher levels, it can equally be adapted for mail stored in shuttles using platforms as described herein.

In embodiments, FIG. 2C can be used as a buffer subsystem. As one exemplary illustration, the system can be contained in a space of 200 foot long×20 foot wide×20 foot high, and can accept input from all input devices and output on, e.g., 10 conveyors, each having a maximum throughput of 80,000 mail pieces per hour. The transportation paths 2024 are configured to hold the frames, e.g., having side rails for holding hooks of the frame. As the frame passes a certain conveyor, from the input section, it can be ejected there from by ejection mechanisms such as vacuums, pusher arms, etc. Once on the adjacent conveyor, the frames can be vertically transported.

FIGS. 2D-2G show details of a platform used with respect to the embodiment shown in FIGS. 2A and 2B. Generally, in either embodiment, the platform includes a rack and pinion track system for moving the platform between positions. The platform may be moved toward and away from any of the cells in a vertical or horizontal plane, depending on whether the platform is transporting shuttles in an aisle (reference 2010 of FIG. 2B) or between different levels. Also, in embodiments, as the platform is moveable, the cell is stationary.

More specifically, the platform may include an independent transport surface 2025 that may be, for example, one or more conveyor belts 2030, 2035, 2040 attached to a frame member 2045. The transport surface 2025, in such a configuration, may be an independent unit that is designed to transport shuttles onto and off of itself. The conveyor belts 2030, 2035 and 2040 may be driven belts, driven from a central pulley system shown generally at reference numeral 2042. This allows the conveyor belts 2030, 2035 and 2040 to be driven in two different directions, for loading and unloading shuttles. Conveyor belts 2030, 2035 and 2040 can alternatively be rollers.

As shown in FIGS. 2D-2G, the platform may be, for example, transported throughout the system of FIGS. 2A and 2B by a rack and pinion system in a horizontal and vertical direction. The rack and pinion system includes respective racks 2065 and a pinion 2070 that includes a gear 2075 cooperating with the racks 2065. The racks 2065, as should be understood by those of skill in the art, will define the track that leads the platforms throughout the system (to different levels, e.g., vertically) and to different aisles (e.g., horizontally) and cells. The tracks can also be used to define the cells, e.g., a grid or matrix of tracks comprising a substantially cube shaped space defined by the intersections of the horizontal and vertical racks.

The gears 2075 may be driven by any known mechanism such as, for example, a motor housed on the platform, itself. The platforms may be powered by a bus bar, or by a power storage device, such as a battery or capacitor. Alternatively or additionally, the platforms may also be charged by a charging device and thus able to move under their own power along the horizontal and vertical paths. By using the rack and pinion system it is thus possible to move the platforms along the tracks and throughout the entire system of FIGS. 2A and 2B.

In further embodiments, a wireless device 2085 may be used to send commands to each of the platforms and/or cells. These commands can originate from the computing infrastructure shown in FIG. 1A, for transporting shuttles to and from certain locations within the system, into the system and out of the system, for example. In this way, it is possible to prepare the mail pieces for sorting and/or sequencing and/or storage.

In use and under control of the computing infrastructure (master server) of FIG. 1, for example, initially, shuttles containing empty frames are temporarily stored in the storage subsystem of FIG. 2B. As the shuttles are needed, they are discharged to the transportation system and sent to an induction subsystem, to provide empty frames. Then, shuttles loaded with filled frames of mail pieces are sent back to storage subsystem via the transportation system. The shuttles containing filled frames may now be positioned in the buffer system, e.g., in the cells, via the use of the platforms, in a predetermined position. More specifically, the shuttles are put onto the platforms via the cross belt mechanism and transported to an appropriate cell via the rack and pinion system.

To obtain a particular order of the shuttles within the system, the storage area may be used to temporarily store some of the shuttles to permit rearranging of the shuttles. Also, the mail frames may be sorted and sequenced, placed back on the shuttles and replaced in the system of FIG. 2B for future retrieval. In this regard, mail frames filled with mail pieces may be removed from the shuttles at the distribution grid 2000 for sorting or sequencing and reinserted into shuttles at the collection grid 2018.

In particular, sorting at a segment level is performed as follows. Shuttles filled with frames (containing mail pieces) are transported to the distribution grid 2000. Frames are removed from the shuttles and onto frame transport conveyances, e.g., lead screws, for sorting and/or sequencing. In embodiments, the sequencing operation is preferably utilized with 10 shuttles, initially. As the sequencing commences, the sequencing operation is repeated, in embodiments, three times with ten shuttles so that $10^3$ mail pieces are sorted on the first run; sorting includes one hundred shuttles on the second run; and sorting includes one thousand shuttles on the third run. The filled shuttles can be transported to the cells for buffering, intermittently throughout the sorting and/or sequencing process, and/or all removed and transported as a stream, for example, for mail piece extraction.

Even more specifically, in embodiments, a plurality of shuttles, e.g., 10 shuttles, are removed from the storage cells 2015 in order to sequence the mail pieces. The shuttles are transported to docking stations where the mail pieces, in frames, are removed from the shuttles in order to begin the sequencing process for these mail pieces. In embodiments, each shuttle will accommodate an average of about 100 mail pieces (although more or less mail pieces per shuttle are also contemplated by the invention depending on the sizes of the mail pieces). In a contemplated embodiment, the mail pieces will be run through the sequencer three times in order to place them in sequence in relation to each other. For each pass, the mail pieces are removed from the shuttles at the distribution grid 2000 and transported through the frame transport tube FTT and reloaded back into the shuttles at the collection grid 2018, all of which constitute the sequencer. This results in a chain of 10 shuttles. The distribution grid 2000 and the collection grid 2018 can each include 10 docking stations, for example.

After a sequencing process, the chain of shuttles is brought back to the buffer 2005 for storage in respective storage cells 2015. The location and content of these shuttles are recorded, for example, by the computing infrastructure of FIG. 1A, for later retrieval. In one contemplated embodiment, this process will be repeated 10 times, e.g., until 100 shuttles are processed. Once the contemplated amount of shuttles is processed, e.g., 100 shuttles, the mail pieces in each of the processed shuttles are returned for the post sequence collection process to build a snake of shuttles (e.g., 100 shuttles) such that all of the mail pieces in the snake, e.g., about 10,000, are now in a sequence.

After the post sequence collection process, the snake of shuttles is brought back to the buffer 2005 for storage in respective storage cells 2015. The location and content of these shuttles are recorded, for example, by the computing infrastructure of FIG. 1A, for later retrieval. In embodiments, this post sequence collection process can be repeated 10 times to produce 10 snakes of shuttles for final sequencing and dispatch. Once the contemplated amount of shuttles is processed, e.g., 1000 shuttles or when all of the mail pieces are received for the day, the mail pieces in each of the processed shuttles are returned for the dispatch process to build a stream of shuttles (e.g., 1000 shuttles) such that all of the mail pieces in the stream, e.g., about 100,000 mail pieces, are now in a final sequence and sent to the frame extractor for extraction of the mail pieces.

In further embodiments, the system is capable of providing its own maintenance. In this regard, certain platforms (e.g., transport elements) may be dedicated to be special, or service, transport elements. These special transport elements troubleshoot other platforms that are unable to move or have failed in other ways. In embodiments, a special transport element moves in proximity to a failed platform, attaches to it by a conventional latching mechanism, and retracts the pinions of the failed platform by use of a robotic arm or activating a spring loaded pinion mechanism. The special transport element then transports the failed platform from the system for servicing.

In embodiments of the invention, the sequencing process is performed as follows: (1) a grid transport unit (GTU) or platform, in an ASRS aisle extracts a shuttle from a storage rack cell; (2) the ASRS GTU transports the shuttle to the distribution grid interface; (3) the shuttle is driven off of the ASRS GTU and on to a turntable; (4) the turntable rotates the shuttle ninety degrees; (5) a distribution grid GTU extracts the shuttle from the turntable; (6) the distribution grid GTU transports the shuttle to an input frame transport tube (FTT) docking station; (7) the distribution grid GTU shuttle partially ejects the shuttle into the input docking station so it can be engaged; (8) the frames are driven from the shuttle into the input of the FTT; (9) when the shuttle is empty, the docking station disengages and the distribution grid GTU pulls the shuttle back on board; (10) the distribution grid GTU transports the empty shuttle to the grid crossover conveyor; (11) the distribution grid GTU ejects the shuttle onto the grid crossover conveyor; (12) a collection grid GTU receives the empty shuttle from the grid crossover conveyor; (13) the collection grid GTU transports the empty shuttle to an output FTT docking station; (14) the collection grid GTU shuttle partially ejects the shuttle into the output docking station so it can be engaged; (15) the frames are received by the shuttle from the output of the FTT; (16) when the shuttle is full, the docking station disengages and the collection grid GTU pulls the shuttle back on board; (17) the collection grid GTU transports the filled shuttle to the grid crossover conveyor; (18) the collection grid GTU ejects the shuttle onto the grid crossover conveyor; (19) a distribution grid GTU receives the filled shuttle from the grid crossover conveyor; and (20) the distribution grid GTU either takes the shuttle to an input docking station for continued sequencing or to an ASRS interface to go back into storage.

According to aspects of the invention, additional processing may be performed as follows: (1) shuttles with empty frames are sent to induction; (2) empty frames are fed into the inserter systems so that mail pieces can be placed into them; (3) the shuttles that have emptied their frames into the inserters, now go to the presort accumulator; (4) the now filled and presorted frames are loaded into the shuttles; (5) the full shuttles are transported back to the appropriate segment; and (6) once in the segment, the frames are sorted again to the unit level, with five units per segment. The invention is not limited to any particular order of the above-described processing steps, and it is to be understood that steps may be performed in a different order than described herein. Moreover, steps may be omitted and/or other steps may be added within the scope of the invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, and combinations thereof such as are within the scope of the appended claims.

It is claimed:

1. A system, comprising:
   a plurality of frames transported in a face-to-face orientation;
   at least one frame inserter which is structured to place individual mail pieces into each of the plurality of frames;
   a plurality of shuttles which are structured to store the plurality of frames in the face-to-face orientation;
   a receiving and/or discharge station which is structured and arranged to receive and discharge the shuttles; and
   a transportation system adjacent to a plurality of storage aisles and cells, the transportation system comprising a plurality of platforms which are moveable through multiple levels of storage comprising the storage aisles and storage cells and which are structured and arranged to transport the shuttles through each level of the multiple levels.

2. The system of claim 1, further comprising a presort accumulator and wherein the receiving and/or discharge station receives:
   empty shuttles for temporary storage and discharges the empty shuttles to the presort accumulator where they are filled with the frames; and
   filled shuttles from the presort accumulator or other subsystems.

3. The system of claim 1, further comprising at least one buffer system.

4. The system of claim 3, wherein the at least one buffer system is two or more buffer systems bridged to work as a single unit.

5. The system of claim 1, wherein the storage cells are on either or both side of the storage aisles, and adjacent to the platforms such that the shuttles can be moved from the platforms to either side of the aisles to any of the storage cells.

6. The system of claim 1, wherein the transportation system includes a buffer system for storing the shuttles, the buffer system comprises a plurality of the storage cells which temporarily store the shuttles during sorting and/or sequencing processes.

7. The system of claim 1, further comprising a collection grid structured and arranged to refill empty shuttles, wherein:
   while the frames filled with objects are processed, the empty shuttles are moved to the collection grid; and
   after the frames filled with the objects are processed, they are loaded into the empty shuttles at the collection grid.

8. The system of claim 1, wherein contents of the shuttles are recorded in a database as they are placed on the shuttles, and the shuttles are tracked by sensors as they enter and exit into and out of the system.

9. The system of claim 1, further comprising an elevating system comprising a plurality of levels, fed from a transportation path structured and configured to transport objects that are stored in the frames on the shuttles.

10. The system of claim 1, wherein the platforms comprise a rack and pinion track system for moving the platforms toward and away from any of the storage cells in a vertical or horizontal plane, depending on whether the platform is transporting shuttles in an aisle or between different levels.

11. The system of claim 10, wherein each of the platforms include an independent transport surface comprising one or more conveyor belts or rollers attached to a frame member, wherein the transport surface is an independent unit that is structured to transport the shuttles onto and off of itself.

12. The system of claim 11, wherein the conveyor belts are driven from a central pulley system to drive the conveyor belts in two different directions, for loading and unloading the shuttles.

13. The system of claim 11, further comprising a rack and pinion system which drives the platforms in a horizontal direction and a vertical direction, wherein the rack and pinion system includes respective racks and a pinion that includes a gear cooperating with the racks, the racks define the track that leads the platforms to different levels vertically and to different aisles horizontally, and to different cells.

14. The system of claim 13, wherein the tracks define the storage cells as a grid or matrix of tracks comprising a substantially cube shaped space defined by intersections of horizontal and vertical racks.

15. The system of claim 1, further comprising a wireless device which sends commands to each of the platforms and/or the storage cells, as originated from a computing infrastructure for transporting the shuttles to and from certain locations within the system, into the system and out of the system.

16. The system of claim 1, wherein selected platforms are dedicated as a transport element which troubleshoot other platforms that are unable to move or have failed, wherein the transport element moves in proximity to a failed platform, attaches to it, and retracts pinions of the failed platform by use of a robotic arm or activating a spring loaded pinion mechanism.

17. The system of claim 1, wherein the at least one frame inserter is a rotary inserter.

18. The system of claim 17, wherein the plurality of frames are structured to be closed to prevent the mail pieces from escaping during sortation and transportation.

19. The system of claim 18, wherein the plurality of platforms travel through a grid or matrix of tracks that allows each platform access to every buffering cell or bin of the storage.

20. The system of claim 19, wherein the platforms attach to the tracks that allow them to move vertically and/or horizontally to receive and dispatch shuttles.

* * * * *